(12) United States Patent
De Vries et al.

(10) Patent No.: US 12,013,090 B2
(45) Date of Patent: Jun. 18, 2024

(54) LIGHTING DEVICE FOR PROVIDING A NATURAL LIGHTING EFFECT

(71) Applicant: SIGNIFY HOLDING B.V., Eindhoven (NL)

(72) Inventors: Hendrikus Johan Adrie De Vries, Veldhoven (NL); Martinus Hermanus Wilhelmus Maria Van Delden, Venlo (NL); Dragan Sekulovski, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/023,929

(22) PCT Filed: Sep. 13, 2021

(86) PCT No.: PCT/EP2021/075109
§ 371 (c)(1),
(2) Date: Feb. 28, 2023

(87) PCT Pub. No.: WO2022/058284
PCT Pub. Date: Mar. 24, 2022

(65) Prior Publication Data
US 2024/0011611 A1    Jan. 11, 2024

(30) Foreign Application Priority Data

Sep. 17, 2020  (EP) .................................... 20196669

(51) Int. Cl.
*F21S 10/02*    (2006.01)
*F21Y 105/12*   (2016.01)
(Continued)

(52) U.S. Cl.
CPC ............ *F21S 10/023* (2013.01); *H05B 45/10* (2020.01); *H05B 45/20* (2020.01); *H05B 45/30* (2020.01);
(Continued)

(58) Field of Classification Search
CPC .. F21S 10/023; F21S 10/00; F21S 4/20; F21S 4/28; F21Y 2105/12; F21Y 2105/16;
(Continued)

(56) References Cited

U.S. PATENT DOCUMENTS

| 2003/0178627 A1 | 9/2003 | Marchl et al. | |
| 2010/0302773 A1* | 12/2010 | Kokoski | F21S 4/28 362/231 |

(Continued)

FOREIGN PATENT DOCUMENTS

| DE | 202010014942 U1 | 2/2012 |
| WO | 2009109387 A1 | 9/2009 |

*Primary Examiner* — William N Harris

(57) ABSTRACT

A lighting device comprising at least three LED chains, each LED chain including a plurality of LED light sources separated from each other along the LED chain, wherein the LED light sources of each LED chain are electrically connected to a common drive signal line, wherein the light sources of the at least three LED chains are substantially evenly and non-symmetrically distributed over a light area, and a controller configured to apply a different drive signal to each drive signal line, wherein each drive signal is time varying so as to cause a time variation of at least one property of light emitted from the LED light sources. By applying different, and dynamically changing drive signals to the three groups, lighting effects resembling those occurring in nature can be accomplished, at a fraction of the costs of a pixelated and addressable device.

13 Claims, 2 Drawing Sheets

(51) Int. Cl.
*F21Y 115/10* (2016.01)
*H05B 45/10* (2020.01)
*H05B 45/20* (2020.01)
*H05B 45/30* (2020.01)
*H05B 47/11* (2020.01)
*H05B 47/16* (2020.01)

(52) U.S. Cl.
CPC ............ *H05B 47/11* (2020.01); *H05B 47/16* (2020.01); *F21Y 2105/12* (2016.08); *F21Y 2115/10* (2016.08)

(58) Field of Classification Search
CPC ..... F21Y 2115/10; H05B 47/16; H05B 45/10; H05B 45/20; H05B 45/30
See application file for complete search history.

(56) References Cited

U.S. PATENT DOCUMENTS

| | | | |
|---|---|---|---|
| 2013/0077299 | A1 | 3/2013 | Hussell et al. |
| 2015/0300597 | A1* | 10/2015 | Baaijens ................ F21S 8/061 |
| | | | 362/148 |
| 2017/0032717 | A1* | 2/2017 | Michaelidis ........ G09F 13/0413 |
| 2017/0202190 | A1 | 7/2017 | Wascher |
| 2018/0132330 | A1 | 5/2018 | Chong et al. |
| 2019/0327908 | A1 | 10/2019 | Goettle et al. |
| 2020/0077481 | A1* | 3/2020 | Niestroj ................ H05B 45/10 |
| 2020/0229405 | A1 | 7/2020 | Lowry et al. |
| 2023/0072928 | A1* | 3/2023 | Vilem ..................... F21V 3/10 |

* cited by examiner

LIGHTING DEVICE FOR PROVIDING A NATURAL LIGHTING EFFECT

CROSS-REFERENCE TO PRIOR APPLICATIONS

This application is the U.S. National Phase application under 35 U.S.C. § 371 of International Application No. PCT/EP2021/075109, filed on Sep. 13, 2021, which claims the benefit of European Patent Application No. 20196669.4, filed on Sep. 17, 2020. These applications are hereby incorporated by reference herein.

FIELD OF THE INVENTION

The present invention relates to a lighting device for providing a natural lighting effect, and in particular such a lighting device using LED-based light sources.

BACKGROUND OF THE INVENTION

An example of a natural lighting effect is the shadow dynamics of tree leaves moving in the wind which can be observed on projection surfaces (e.g. the ground) during a bright sunny day. It is important to note that even when the leaves are not observed directly, their dynamics is maintained in the movement of the shadows. Hence the observed shadows feel natural, comfortable and safe (at moderate to low wind speeds) even when the fine features and true colors of the leaves are not observed directly at the same time. So, on outdoor surfaces a natural feeling lighting effect may be observed, which lighting effect may be described as a combination of a larger group of less bright areas (the overlapping shadows of the individuals leaves) moving within a brighter field of diffuse and directional (sun)light.

Another example of a natural lighting effect comprising a different set of dynamics, colors and speed of change is an open fire. Similar to the previous, even when the fireplace is not observed directly, the resulting light experience presented via reflection on surfaces in the vicinity of the fire, feels familiar, comfortable, relaxing and natural.

Yet another example of a natural lighting effect are sparkles, for example arising from the reflection of the sun's rays at the wave peaks of water set in motion. Again, when the deflected light falls onto a surface, the light experience feels natural and calming although the sun and the waves are not observed directly. In other words, a light experience can already feel natural and comfortable without the need for an actual observation of the cause.

In some situations, it is desirable to (artificially) provide the positive effects of such natural lighting effects, also indoors and when no outdoor light is present. One option is to use conventional high-resolution displays and/or beamer devices, by which natural content (e.g. a fireplace) is displayed. However, if such a device or its projected image is not or is no longer observed directly, the feeling of a natural experience is rapidly lost. This is because the information retained in the far field only comprises of an average light intensity, color and frequency of change. On the other hand, in case that the content is observed directly, the cognitive part of the human brain is immediately triggered to analyze that content (e.g. the fire) in further detail, therewith distracting for example office workers from their main tasks. On top of that, rich content can be subject to personal and cultural preferences, thereby potentially resulting in even larger distractions. The underlying natural dynamics and their beneficial effects, however, are typically universal and not bound to culture and/or religion.

Obviously, the challenges in avoiding cognitive image processing can be solved technically, for example by providing non-looped content based on the principles of nature, yet at sufficiently low-resolution. And, to enhance the experience even further, it may be provided as an immersive light experience rather than a (single) framed execution thereof. A challenge in immersive natural light experiences is that multiple large-sized (elongated) light areas may be required to yield an omnidirectional, 360 natural light, experience.

A further challenge in large-sized, pixelated light-areas is cost of pixelation. That is, the cost of addressable light nodes such as pixelated LED strips or matrix panels are relatively high and furthermore, cost of control components to drive these is also high. Moreover, when a large-sized (elongated) light-area is formed using a plurality of e.g. pixelated LED strips, for example, to at least provide an acceptable device resolution, the costs per unit area already skyrocket, in particular when medium to high-power, multi-color light nodes are also to compete with ambient (day) light.

For the sake of clarity and reference, also note that although costs do not necessarily pose a barrier to the application of matrix addressable lighting devices, for example in the entertainment industry (e.g. high budget TV shows), similar devices are not deployed in office and hospitality areas simply because they are unaffordable.

Note however, that as indicated above, high resolution images are not required to provide a natural lighting effect. What is required is that the lighting effect feels natural, comfortable and relaxing, i.e. the created content represents an abstract light experience comprising the appropriate set of dynamics, correct color(s), resolution, intensity, relative intensity (ratios), frequency and frequency of change (ramp-up, ramp-down and hold, color transition), etc. One known method to generate such (random) content is the use of Markov chains and mapping the generated image towards the matrix addressable light area.

SUMMARY OF THE INVENTION

It is an object of the present invention to address the shortcomings of the prior art, and to provide a low-cost, large-area, pixelated light-area that can provide a natural lighting effect.

According to a first aspect of the invention, this and other objects are achieved by a lighting device for providing a natural lighting effect, comprising at least three LED chains, each LED chain including a plurality of LED light sources separated from each other along the LED chain, wherein the LED light sources of each LED chain are electrically connected to a common drive signal line, wherein the light sources of the at least three LED chains are substantially evenly and non-symmetrically distributed over a light area, and a controller configured to apply a different drive signal to each drive signal line, wherein each drive signal is time varying so as to cause a time variation of at least one property of light emitted from the LED light sources.

The expression "substantially evenly distributed" is intended to mean that the LED light sources of each of the at least three LED chains are spread out across the entire light area and not e.g. gathered in a small portion of the light area.

The expression "non-symmetrically distributed" is intended to mean that the LED light sources of the at least three LED chains are distributed and mixed (between the different chains) together in a seemingly random pattern, and not e.g. in a regular pattern.

By distributing the LEDs of the three LED chains in a substantially even and non-symmetrical manner across the light area, three groups of more or less randomly distributed LEDs may be controlled independently of each other. By applying different, and dynamically changing drive signals to the three groups, lighting effects resembling those occurring in nature can be accomplished, at a fraction of the costs of a pixelated and addressable device. The invention thus provides a lighting experience which is similar to that caused by a natural lighting effect as discussed above, in a cost-efficient manner.

Experiments show that a simple prototype with only three LED chains is capable of providing a natural lighting experience without triggering any detection of repetitive content generation or creation. This was true even when the three LED chains were driven by the same pre-programmed curve, but running at an offset and at a slightly different speed compared to each other.

Examples of non-pixelated LED chains are strings of either equal or different number of light sources (nodes). The LED light sources may include a single LED or a group of LEDs, e.g. a suitable combination of different color LEDs. The number of nodes is preferably at least 20, and more preferably at least 40, but significantly larger numbers may also be possible. The LED chains may be either monochrome, bi-chrome or multi-chrome (RGB-CW/WW) or a mixed palette thereof. Beneficially, the colors of the LEDs in a LED chain are optimized towards the intended natural lighting effect. For example, in the case of shadow dynamics and dapple like effects, shades of green and white may improve the intended illusion. In other instances, shades of red, orange and yellow may be sufficient, whereas in other instance shades of blue and white, optionally enriched with some green are sufficient. Therefore, a LED chain does not necessarily need to be fully color capable. Instead, a dressed-down, limited color palette may be selected (cost and effect optimized).

The properties of emitted light that change over time as a result of the varying drive signals may include color and/or intensity. Color changes may include changing non-white colors, but may also be restricted to varying the shade(s) (color temperature) of white.

The waveforms (i.e. patterns of change) of the different drive signals may be continuous, i.e. without discrete change, or involve step-wise change (e.g. sparkle). The waveforms of the drive signals may further have varying rate of change, and/or include linear ramps. The waveforms may be regular and periodic, or may change over time.

Each drive signal may have a common waveform but with a different offset in time. As a simple example, three sine-shaped drive signals can be phase-shifted to produce three different drive signals with the same waveform (sine-shaped).

The drive signals may include variations on a relatively shorter time scale and variations on a relatively longer time scale variation. Variations on different time scales (i.e. with different time constants) may be used to represent e.g. the long rhythm of a day and the faster rhythm of tree leaves moving in the wind.

According to some embodiments, the device includes at least two groups of LED chains, and wherein the LED light sources of the two groups are distributed so that a boundary line is formed between the LED light sources of the two groups. Such a boundary line may serve to represent a natural boundary between areas of different types of lighting characteristics. One typical example is the horizon, i.e. the boundary between sky and sea. But also the boundary between sky and land, or indeed between different parts of the landscape, may provide similar effects. By controlling the LED chains of the two groups in a different manner, such natural border effects may be simulated by the lighting device. For example, the LED light sources of one group may be controlled to emit light within a different color range (different shade) than an adjacent group. Another example is where the drive signals of one group change more rapidly than those of another.

Further, by including a plurality (e.g. more than two) groups of LED chains, for example in the shape of strips across the light area (e.g. horizontally), several boundaries between groups are formed. Thereby, it becomes possible to selectively visualize one or several of these boundaries by appropriate drive signal control.

According to another embodiment, the device includes at least two groups of LED chains, and the two groups have different densities of LED light sources. The group with the higher density may then provide a more local effect of higher-resolution such as sparkle.

In some embodiments, the light area is provided with an outer layer having a surface texture. Such a surface texture may then be configured to match the desired light experience. For example, the surface texture of a textile based light area may comprise vertical (and/or horizontal) lines by means surface texture created by weaving errors, knots, (fibered) yarns or yarns of irregular diameter of some sort, to mimic fields of grass, reeds or grain.

The device may further include an ambient light intensity sensor connected to the controller, and the controller can then be configured to adjust the drive signals such that a visibility of the lighting effect is adjusted towards the ambient light level.

The light area can be a direct view screen, where the light emitted by the LEDs is projected onto a (semi) translucent screen. Alternatively, the light area may serve as a light engine (lamp) of a projection device, where the image is formed directly by the light engine. Such a light engine may be a chip-on-board (COB) LED device.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

DETAILED DESCRIPTION OF CURRENTLY PREFERRED EMBODIMENTS

Figure 1:
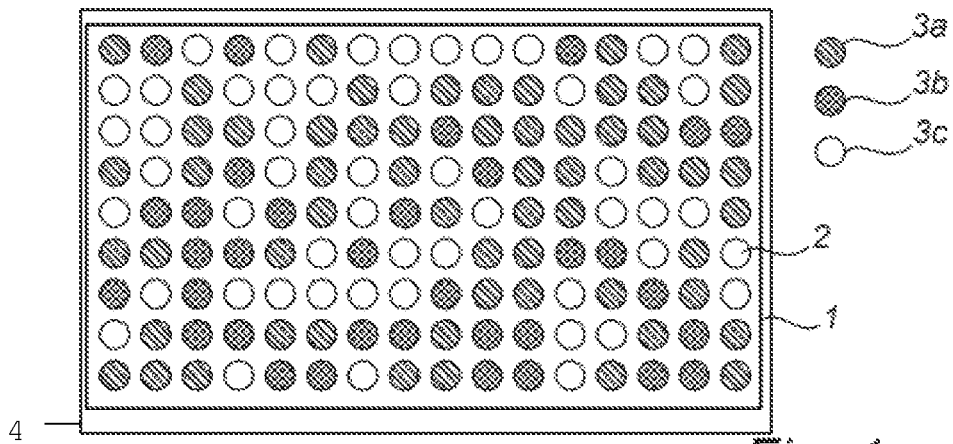
FIG. 1 shows schematically a distribution of LED light sources of three LED chains.

FIG. 1 shows a light area 1 comprising of an array of 9×16 pixels or LED light sources (nodes) 2. Three non-pixelated LED chains 3a, 3b, 3c, each including 48 LED light sources (nodes) 2 have been deployed to address all the LED light sources/pixels 2 in the array. The assignment of each LED light sources/pixels 2 in a given LED string (3a, 3b or 3c) is random (i.e. not systematic), and as a result the LED light sources/pixels 2 of each LED chain are spread out substantially evenly (similar sparsity) across the entire area in a non-symmetrical (or non-regular) manner. The randomized positions of the LED light sources/pixels 2 in FIG. 1 can for example be routed onto a PCB, with the electric tracks providing the intended allocation of each LED light source/pixel 2 to a given LED chain. In some embodiments the light area 1 is provided with an outer layer 4 having a surface texture.

The distribution of pixels (i.e. possible locations of light nodes) may be regular (e.g. a rectangular grid) or irregular (e.g. Voronoi, polygonal or hexagonal arrays). The distribution may further exhibit gradients and/or local variation in density (the number of light nodes per area temporarily increases and/or decreases) with the local density variation being either uniform and/or non-uniform in nature (e.g. mix of coarse and fine meshes).

Figure 2:
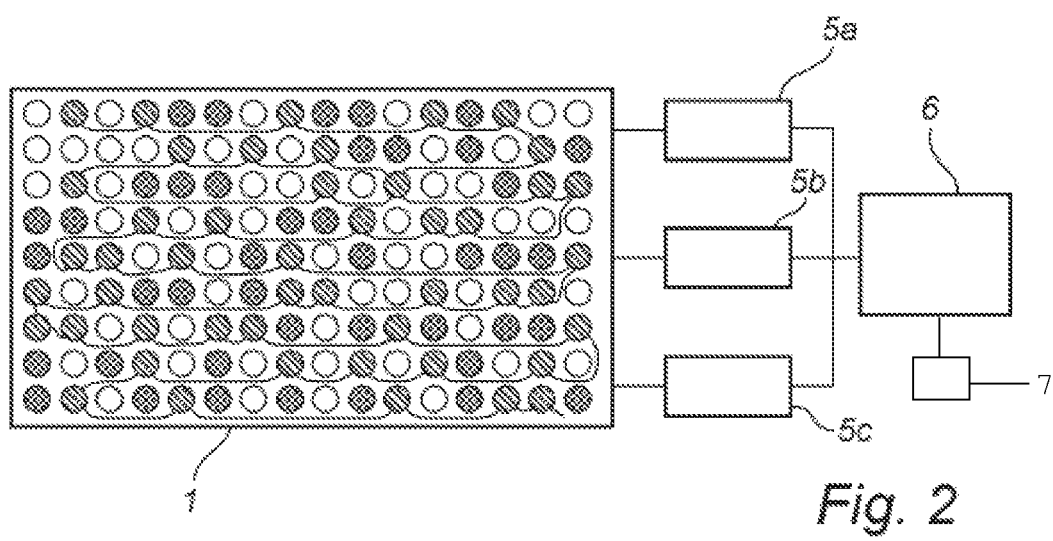
FIG. 2 shows three LED chains with a control arrangement according to an embodiment of the invention.

FIG. 2 shows how the three LED chains 3a, 3b, 3c in FIG. 1 are each connected to a LED chain driver 5a, 5b, 5c, which each driver being configured to generate drive waveforms. All LED light sources (nodes) of a particular LED chain are driven by the same drive waveform(s).

The drivers are in turn connected to a controller 6 arranged to control the light emission of all LED chains in the light area 1. The controller 6 may be a microcontroller running a suitable control program. The controller 6 may also be connected to an ambient light intensity sensor 7. The ambient light intensity sensor 7 is used by the controller to adjust the drive signals such that a visibility of the lighting effect is adjusted towards the ambient light level.

It is noted that the number of LED chains may be greater than the number of drivers. For example, nine LED chains may be connected to three drivers, three chains to each driver. It is also possible that the output from one single driver (waveform generator) is time shifted to provide a set of different drive signals for driving a set of LED chains differently.

The controller 6 (e.g. the computer program running on a microcontroller) and the drivers are together capable of providing a well-controlled natural light effect, comprising transitions between different intensities, colors, hue, frame rate, etc. The randomized assignment of light source location enables change of scene and content while maintaining a natural and non-looped experience.

Figure 3:
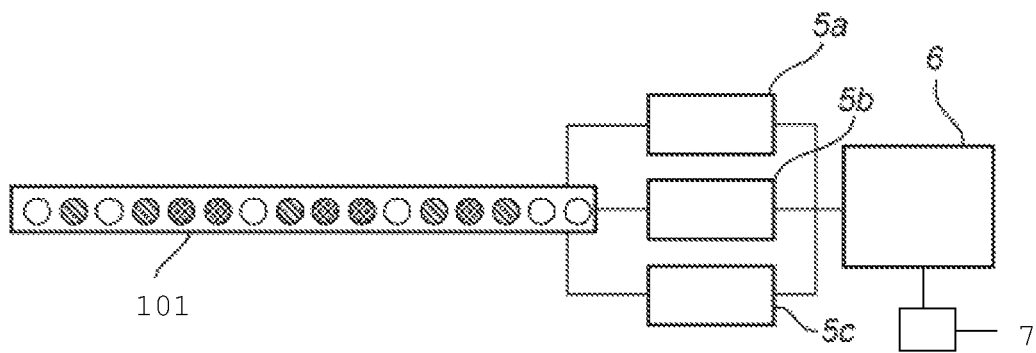
FIG. 3 shows three LED chains with a control arrangement according to another embodiment of the invention.

FIG. 3 shows a strip-shaped light area 101, referred to as a nested LED strip 101, which comprises at least three LED chains 3a, 3b, 3c, as described above, disposed randomly along its length.

Figure 4:
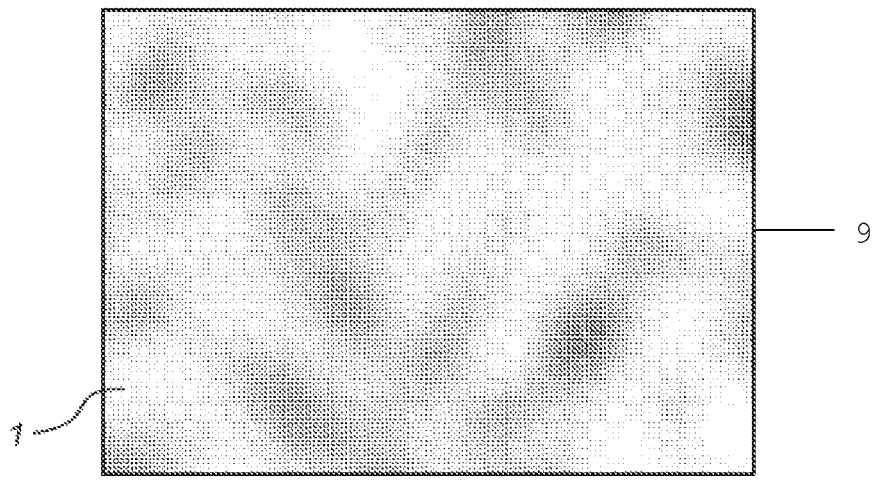
FIG. 4 shows a lighting device according to an embodiment of the invention with three LED chains.

FIG. 4 illustrate the lighting effect of a lighting device according to embodiments of the invention, having three LED chains (and drivers) respectively. A screen 9 has been placed in front of the light area. The screen may be an at least partially transparent projection screen 9

Figure 5:
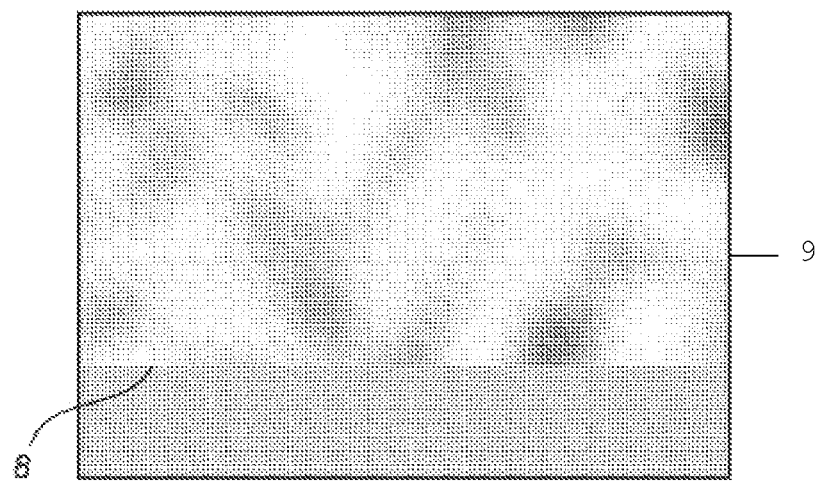
FIG. 5 shows a lighting device with two groups of LED chains separated by a boundary according to an embodiment of the invention.

FIG. 5 shows an example of a light area 1 having two groups of LED chains (each comprising at least three LED chains) defining a boundary between them. In other words, all LED light sources belonging to one group are on one side of the boundary, while all LED light sources of the other group are on the other side. When the LED chains of one group are driven differently from those in the other group, the boundary will become visible, here as a horizontal "horizon" 8 across the light area 1. As an example, LED chains in the group below the horizon 8 may be driven at a different rhythm, different average intensity, or different average color shade than the LED chains in the group above the horizon.

A horizontal line is of course only one example of a boundary between two LED chain groups. Indeed, a boundary may have any shape, including curved, circular and irregular shapes. It may also be an area of certain width. Further, the separation of the two groups of LED chains is not necessarily complete, and a set of LEDs belong to one group of LED chains may be located on the other side of the boundary. In order to obtain the desired visual effect, a majority of the LEDs of each LED chain group should be located on the same side of the boundary.

If the light area comprises more than two groups of LED chains, and consequently more than one boundary between groups, these boundaries may be selectively made visible. As a simple example, if the light area comprises a set of groups of LED chains, each forming a horizontal strip. By appropriate driving, any boundary between two such strips may be made visible, thereby allowing a dynamic positioning of a horizon. It is of course also possible to make more than one boundaries visible, e.g. two horizontal lines in the simple example.

This embodiment results in a highly flexible lighting device, yielding the illusion of a pixelated light area mimicking the principles of nature, for which the level of richness (per group of LED chains) and boundaries (horizons) (one or more) are hardware pre-set.

The person skilled in the art realizes that the present invention by no means is limited to the preferred embodiments described above. On the contrary, many modifications and variations are possible within the scope of the appended claims. For example, the appropriate number of LED chains in each group may be different. Further, the density of the LED chain or group of LED chains may be either uniform or non-uniform for a portion of a light area.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A lighting device for providing a natural lighting effect, comprising:
    at least three LED chains, each LED chain including a plurality of LED light sources separated from each other along the LED chain, wherein the LED light sources of each LED chain are electrically connected to a common drive signal line,
    wherein the light sources of said at least three LED chains are substantially evenly and non-symmetrically distributed over a light area, and
    a controller configured to apply a different drive signal to each drive signal line, wherein each drive signal is time varying so as to cause a time variation of at least one property of light emitted from the LED light sources.

2. The lighting device according to claim 1, wherein said properties include color and/or intensity.

3. The lighting device according to claim 1, wherein each drive signal has a common waveform with a different time offset.

4. The lighting device according to claim 1, wherein the drive signals include variations on a relatively shorter time scale and variations on a relatively longer time scale variation.

5. The lighting device according to claim 1, wherein the drive signals have continuous waveforms.

6. The lighting device according to claim 1, wherein the drive signals have varying rate of change.

7. The lighting device according to claim 1, wherein the drive signals have waveforms including linear ramps.

8. The lighting device according to claim 1, wherein the device includes at least two groups of LED chains, and wherein the LED light sources of the at least two groups are distributed so that a boundary line is formed between the LED light sources of the at least two groups.

9. The lighting device according to claim 1, wherein the device includes at least two groups of LED chains, and wherein the at least two groups have different densities of LED light sources.

10. The lighting device according to claim 1, wherein the light area is provided with an outer layer having a surface texture, which surface texture is configured to match the desired light experience.

11. The lighting device according to claim 1, further comprising an ambient light intensity sensor connected to the controller, and wherein the controller is configured to adjust the drive signals such that a visibility of the lighting effect is adjusted towards an ambient light level.

12. The lighting device according to claim 1, further comprising an at least partially transparent screen arranged in front of the light area, so that, in use, the lighting effect created by the light area is projected onto the screen and visible from an opposite side of the screen.

13. Use of a lighting device according to claim 1 as a light engine of a light projector, so that, in use, the lighting effect created by the light area is projected onto a screen located in front of the light projector.

* * * * *